(12) United States Patent
Kennedy

(10) Patent No.: US 9,285,037 B2
(45) Date of Patent: Mar. 15, 2016

(54) MUD VALVE WITH INTEGRAL YOKE AND FLANGE

(71) Applicant: Kennedy Valve Company, Elmira, NY (US)

(72) Inventor: Paul Kennedy, Horseheads, NY (US)

(73) Assignee: Kennedy Valve Company, Elmira, NY (US)

( * ) Notice: Subject to any disclaimer, the term of this patent is extended or adjusted under 35 U.S.C. 154(b) by 207 days.

(21) Appl. No.: 14/052,970

(22) Filed: Oct. 14, 2013

(65) Prior Publication Data
US 2015/0101682 A1    Apr. 16, 2015

(51) Int. Cl.
*F16K 15/02* (2006.01)
*F16K 1/34* (2006.01)
*F16K 1/50* (2006.01)
*F16K 27/02* (2006.01)

(52) U.S. Cl.
CPC ... *F16K 1/34* (2013.01); *F16K 1/50* (2013.01); *F16K 27/02* (2013.01); *Y10T 137/6062* (2015.04)

(58) Field of Classification Search
CPC .......... F16K 15/02; F16K 1/50; F16K 27/02; F16K 15/06; F16K 1/34
USPC ........... 137/533.17, 533.19, 533.21, 540, 906
See application file for complete search history.

(56) References Cited

U.S. PATENT DOCUMENTS 937,773 A * 10/1909 Cunning ....................... 137/332

* cited by examiner

*Primary Examiner* — Kevin Lee
*Assistant Examiner* — P. Macade Nichols
(74) *Attorney, Agent, or Firm* — Brown & Michaels, PC

(57) ABSTRACT

A mud valve having a flange frame and yoke that are permanently connected to form a single unit without the aid of removable fasteners is described. Installation of the drain plug is facilitated by an arrangement of guide tabs on either side of the drain plug that are of different distances from the surface of the drain plug. This staggered arrangement allows the drain plug to be installed through a tilting and rotating of the drain plug that brings the tabs into alignment with guide rails on the yoke without necessitating the separation of the yoke from the flange frame. Similarly, the construction described allows the drain plug to be removed for repair or replacement in the field without disassembling the yoke and flange frame.

14 Claims, 6 Drawing Sheets

FIG. 2
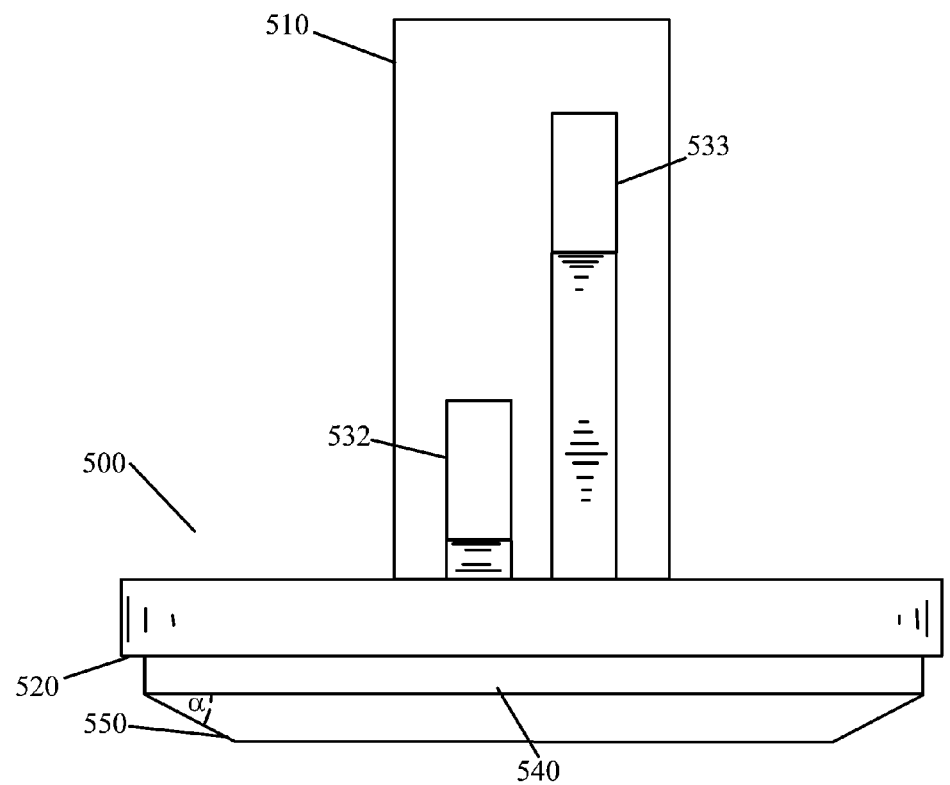
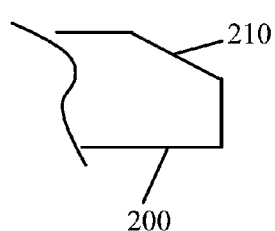
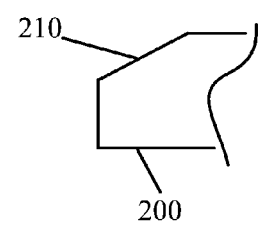

MUD VALVE WITH INTEGRAL YOKE AND FLANGE

FIELD OF THE INVENTION

The invention pertains to the field of industrial valves. More particularly, the invention pertains to settling tank mud valves.

DESCRIPTION OF RELATED ART

Mud valves, also referred to as plug drain valves, are generally designed for installation in settling basin lines, waterworks, sewage treatment plants, and other industrial applications. Sediments may build-up over time in tanks or other fluid holding structures, and require periodic flushing and cleaning of the tank. Mud valves are provided in such situations to provide an outlet for sediments and the fluids used to flush them.

Typically, a mud valve is constructed with a frame which forms a flange which mounts on the bottom of a tank, surrounding a hole which mates the valve to a pipe that serves as a drain portal for the sedimentary material being flushed from the tank. The frame is generally annular in shape, its lower surface forming a flange mating surface, and its inner circumference forming a valve seating surface. A yoke is generally bolted to the frame at right angles to support other operative components of the mud valve. A valve plug is mounted in the central portion of the yoke, parallel to the frame, such that it can be moved into contact with the frame, sealing the central portion of the annular frame. As with the inner circumference of the annular frame, the lower surface of the valve plug is provided with a seating surface which mates to the seating surface on the inner circumference of the annular frame. Both seating surfaces may be constructed with specific seating materials such as brass, rubber, or other materials that are conducive to forming a better seal when the valve is closed.

A threaded lift nut is generally mounted in the apex of the yoke and a thrust nut is generally mounted on the top surface of the valve plug. A threaded stem passes through the lift nut and is connected to the valve plug via the thrust nut, such that when the threaded stem is rotated, the stem causes the valve plug to move from a position of contact with the frame where it creates a seal, to a position away from the frame which opens the mud valve and allows sediments and flushing fluids to flow through the center of the annular frame. Alternatively, a stuffing box may be incorporated in the arch of the yoke to hold the stem at a specific height and a lifting nut may be incorporated on the valve plug to move the valve plug vertically along the stem.

To maintain the proper orientation of the valve plug, and to assure that it does not rotate within the yoke, the valve plug is provided with pairs of tabs extending radially from its circumference on opposite sides, each set of tabs sliding along a guide rail on the inner surface of the yoke arms.

The frame, yoke, and valve plug are normally constructed as individual components of cast iron, brass, stainless steel, or other materials which are compatible with the fluids being held in the tank and the structural requirements imposed by the fluid pressures involved.

Multiple tanks are often connected to a common drain line, and flushed at different times, so the mud valve must be sufficiently strong to block potentially substantial back pressure when other tanks are being flushed. As a result the structural integrity of the valve over time is a critical factor in its construction.

Typically, mud valves are assembled by bringing the drain plug and yoke together so that the drain plug tabs can be properly positioned relative to the guide rails on the inner surface of the yoke arms. The end of each arm of the yoke is provided with a flange having bolt holes which are then used to receive bolts which hold the yoke in its operative position relative to the annular frame. This method of construction and assembly has several disadvantages however.

The bolts used to connect the yoke to the annular frame represent a potential failure point, as they may loosen, corrode, or fail for other reasons over time. Similarly, servicing the valve to replace the valve plug or seating surfaces, for example, may also be complicated by corrosion of the yoke attachment bolts, making them difficult to remove when attempting to disassemble the valve so that the valve plug can be removed. And finally, manufacturing cost of mud valves is affected by this assembly method, as the annular frame and yoke are manufactured as separate components through casting or other means and ultimately bolted together, each of these factors creating additional manufacturing steps requiring manpower and materials expenditures.

SUMMARY OF THE INVENTION

Accordingly, the present invention provides a mud valve constructed from an annular frame and yoke that are a single, permanently connected unit. Additionally, to allow assembly of the mud valve, the valve plug is provided with pairs of tabs wherein the tabs in each pair are a different distance from the upper side of the valve plug. This construction allows the valve plug to be tilted in two planes so that one pair of tabs may be first aligned with one guide rail on one side of the yoke, and then rotated to bring the second pair of tabs into alignment with the guide rail on the other side of the yoke. Later attachment of the stem through the stuffing box to the lifting nut holds the valve plug in this engaged position for proper operation of the mud valve. Thus, assembly and disassembly of the mud valve is simplified as the yoke and frame do not have to be separated when assembling or disassembling the mud valve.

The yoke and annular frame may be formed from a single casting to reduce manufacturing steps. Alternatively, the yoke and annular frame may be formed as two separate units and welded or otherwise permanently fused together to form a single integrated unitary structure. This method of construction eliminates the potential failure of fasteners connecting the yoke and annular frame and simplifies assembly. Further, future service of the mud valve is simplified as the yoke and annular frame do not have to be separated to remove the valve plug for replacement or repair.

BRIEF DESCRIPTION OF THE DRAWING

FIG. 2 shows a side view of the drain plug and seating surfaces.

DETAILED DESCRIPTION OF THE INVENTION

Figure 1:
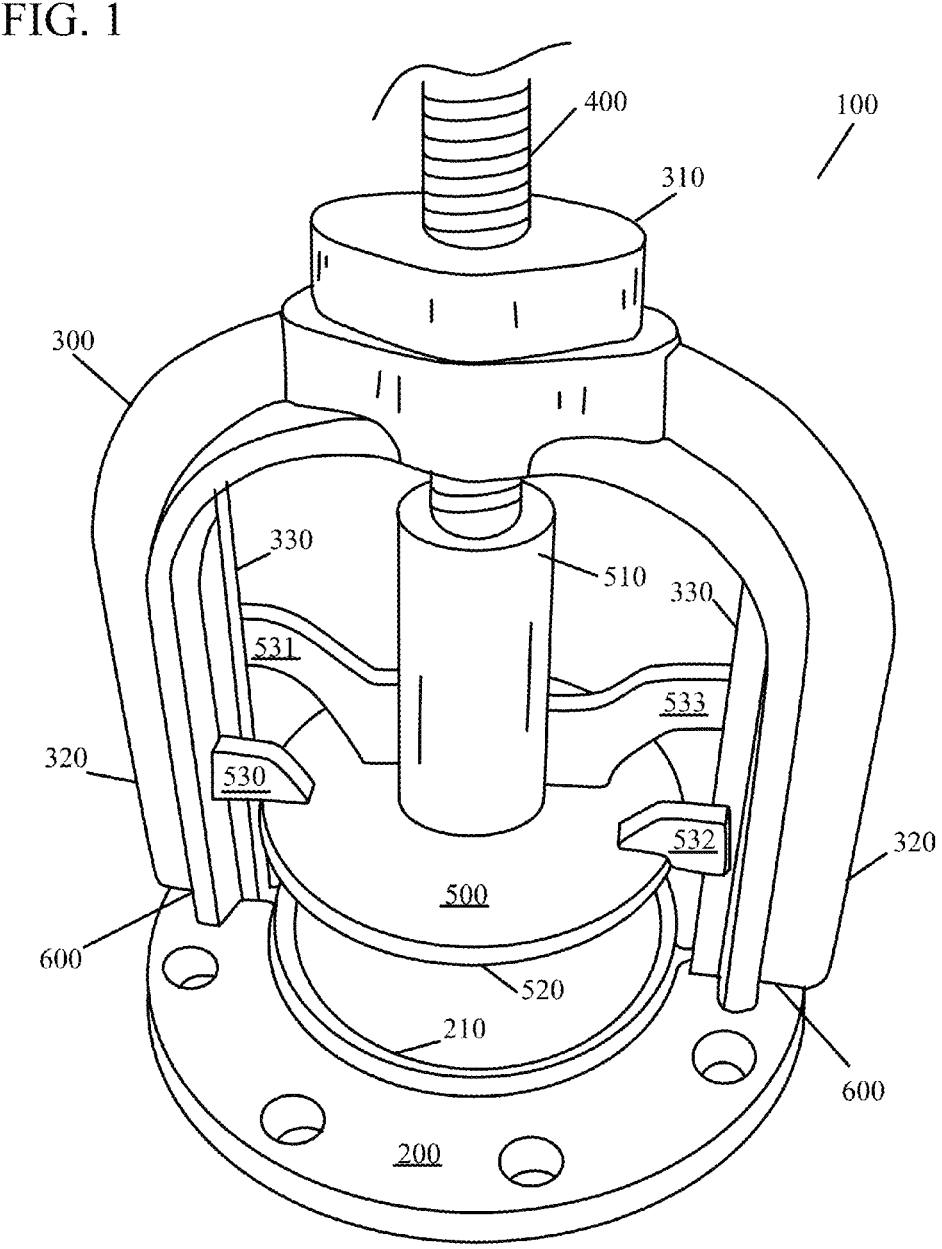
FIG. 1 shows a side perspective from above of a mud valve.

With reference to the drawings, and in particular FIG. 1, a mud valve 100 according to the present invention is shown.

The mud valve 100 is formed by the combination of an annular frame 200, a yoke 300 and a valve plug 500.

A stuffing box 310 through which a threaded stem 400 passes is located at the peak of the yoke 300 and maintains the stem in a fixed vertical position relative to the yoke 300 while still allowing the stem 400 to rotate freely. One end of the threaded stem 400 is coupled to the valve plug 500 by a fitting, for example a lifting nut 510, which allows the threaded stem 400 to rotate and move the valve plug 500 relative to the frame 200. The valve plug 500 is positioned between the yoke 300 arms 320 such that when the valve plug 500 is moved toward the annular frame 200 by turning the threaded stem 400, the lower surface 520 of the valve plug 500 mates with, and seals, the inner circumference 210 of, and space within, the annular frame 200.

The annular frame 200 and yoke 300 are integrated, that is, permanently connected at their intersection 600. This permanent connection may be accomplished by casting the annular frame 200 and yoke 300 as a single unit, milling the two structures from a single piece of material, permanently welding the annular frame 200 and yoke 300 together at their intersection 600, or other means of permanently connecting the two elements into a single unit that does not rely on removable fasteners.

The yoke 300 is provided with guide rails 330 on the inner surface of its arms 320 to maintain the valve plug 500 in its proper orientation when it is moved away from the annular frame 200 by turning the threaded stem 400. The upper side of the body of the valve plug 500 is provided with tabs 530, 531, 532, 533 that slide on either side of the yoke 300 guide rails 330 for this purpose. The tabs 530, 531, 532, 533 are arranged in pairs—a first pair 530 and 531, and a second pair 532 and 533, extending from opposite sides of the valve plug 500. The tabs 530 and 531, 532 and 533 in each pair are separated from each other by a distance such that when the valve plug 500 is in its operational position they form a channel with one tab 530, 531, 532, 533 on each side of the guide rails 330. Further, in each pair of tabs, 530 and 531, 532 and 533, one tab is located a greater distance from the valve plug 500 than the other tab in the set, such that both pairs of tabs have a near tab on the same side of the guide rails, and a far tab on the opposite side of the guide rails. As shown in FIG. 1, near tabs 530 and 532 are closer to the valve plug 500 than far tabs 531 and 533. Near tabs 530 and 532 also ride on the same side of the guide rails 330 as each other, while far tabs 531 and 533 ride on the same side of the guide rails as each other.

The relative position of the tabs 532, 533 on the valve plug 500 is again illustrated in a side view of the valve plug 500 in FIG. 2. As can be seen from this figure, the tab 533 is positioned farther from the valve plug 500 than is tab 532. Further, FIG. 2 shows a valve seat material 540 attached to the bottom of the valve plug 500 that forms a valve seat 550 with an angle of $\alpha$ relative to the plane of the valve plug 500. In preferred embodiments, this angle $\alpha$ is 27 degrees. The inner circumference 210 of the annular frame 200 is similarly constructed to mate with the vale seat 550 of the valve plug 500.

Assembly of the valve plug 500 into the yoke 300 is illustrated in FIGS. 3-6. In the description that follows, "near" and "far" refer to the relative distance of a tab 530, 531, 532, 533 from the upper surface of the valve plug 500. According to one assembly method shown in FIG. 3, the valve plug 500 is tilted from its normal plane of operation and rotated slightly about the axis of the lifting nut 510 so the near tab 532 on one side of the valve plug 500 can be placed on one side of the guide rail 330, leaving the other far tab 533 in that set on the other side of the same guide rail 330. The valve plug 500 is then angled to bring the near tab 530 on the other side of the valve plug to one side of the guide rail 330 and the far tab 531 on the other side of the same guide rail 330. Rotating the valve plug 500 slightly and tilting it at the same time will then bring the tabs 530, 531, 532, 533 into engagement with their respective guide rails 330, leaving the valve plug in the position shown in FIG. 5.

Figure 4:
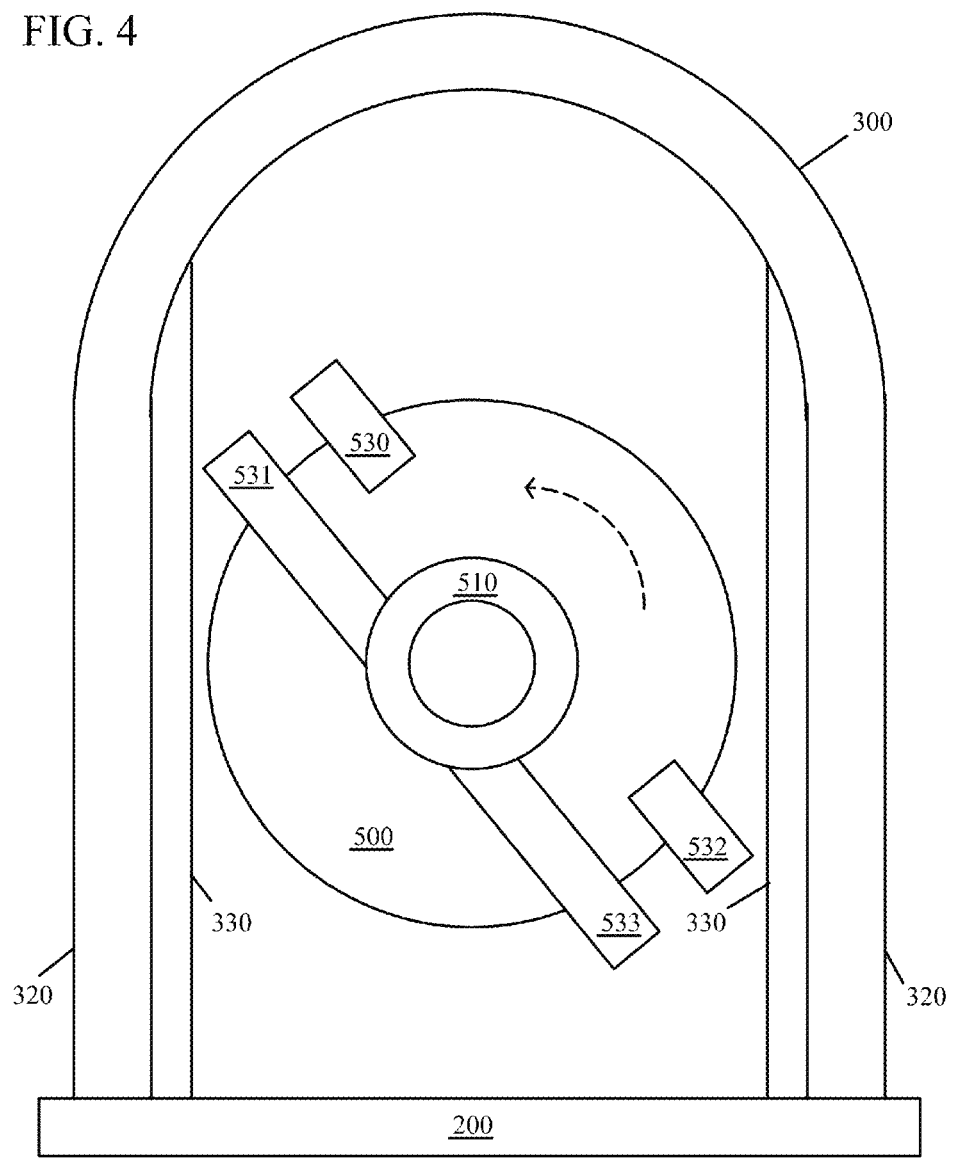
FIG. 4 shows an alternative first step in assembling the drain plug in the yoke.
Figure 5:
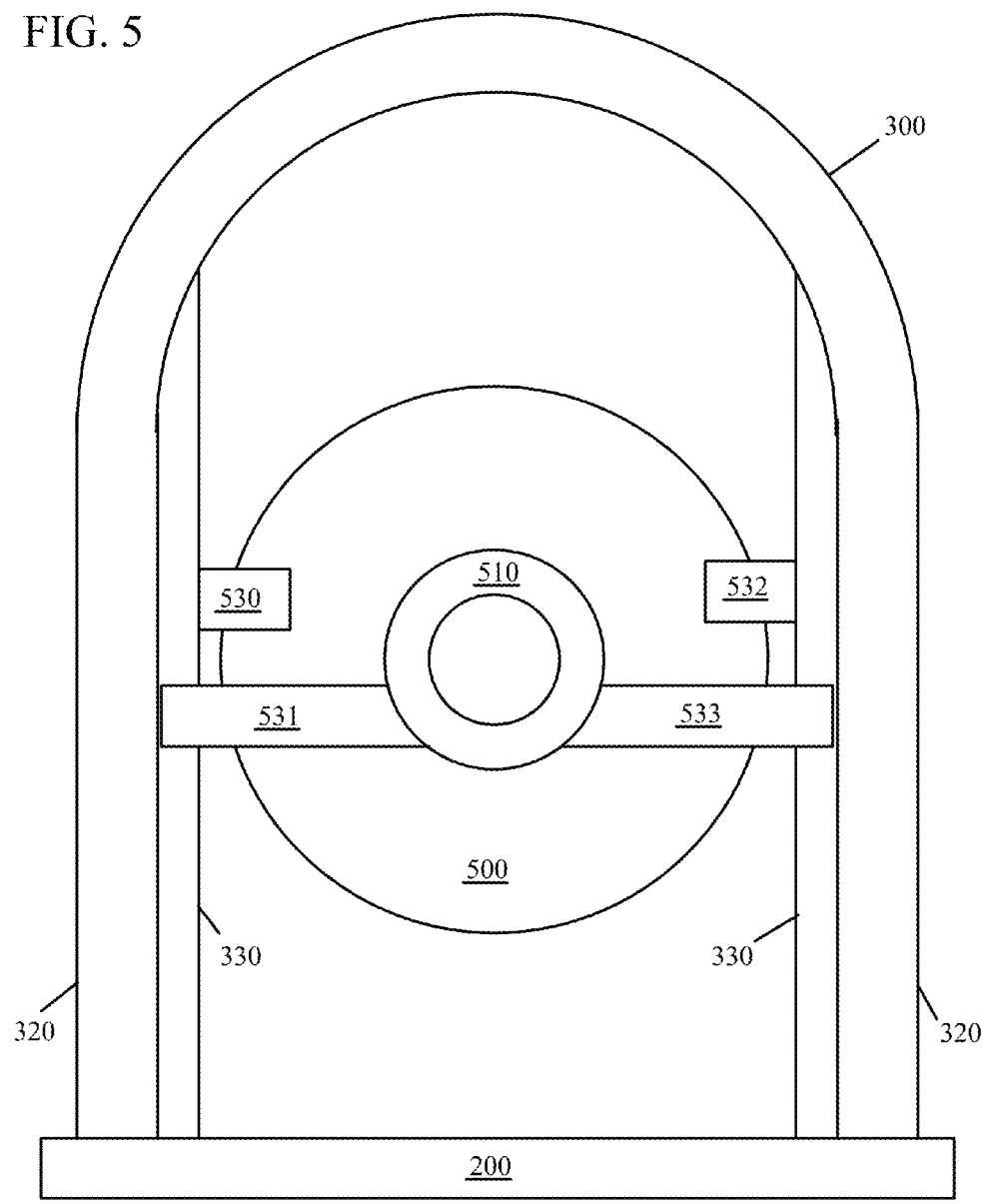
FIG. 5 shows an intermediate step in assembling the drain plug in the yoke.

Alternatively, the valve plug 500 can be tilted 90 degrees from its normal operating position, and simultaneously rotated so that both near tabs 530, 532 are in a position to pass between the guide rails 330 as shown in FIG. 4. The valve plug 500 is then placed in the yoke 300 such that when it is rotated in the direction shown by the dotted arrow in FIG. 4, the near tabs 530, 532 and far tabs 531, 533 will engage opposite sides of the guide rails 330, leaving the valve plug 500 again in the position shown in FIG. 5.

Figure 3:
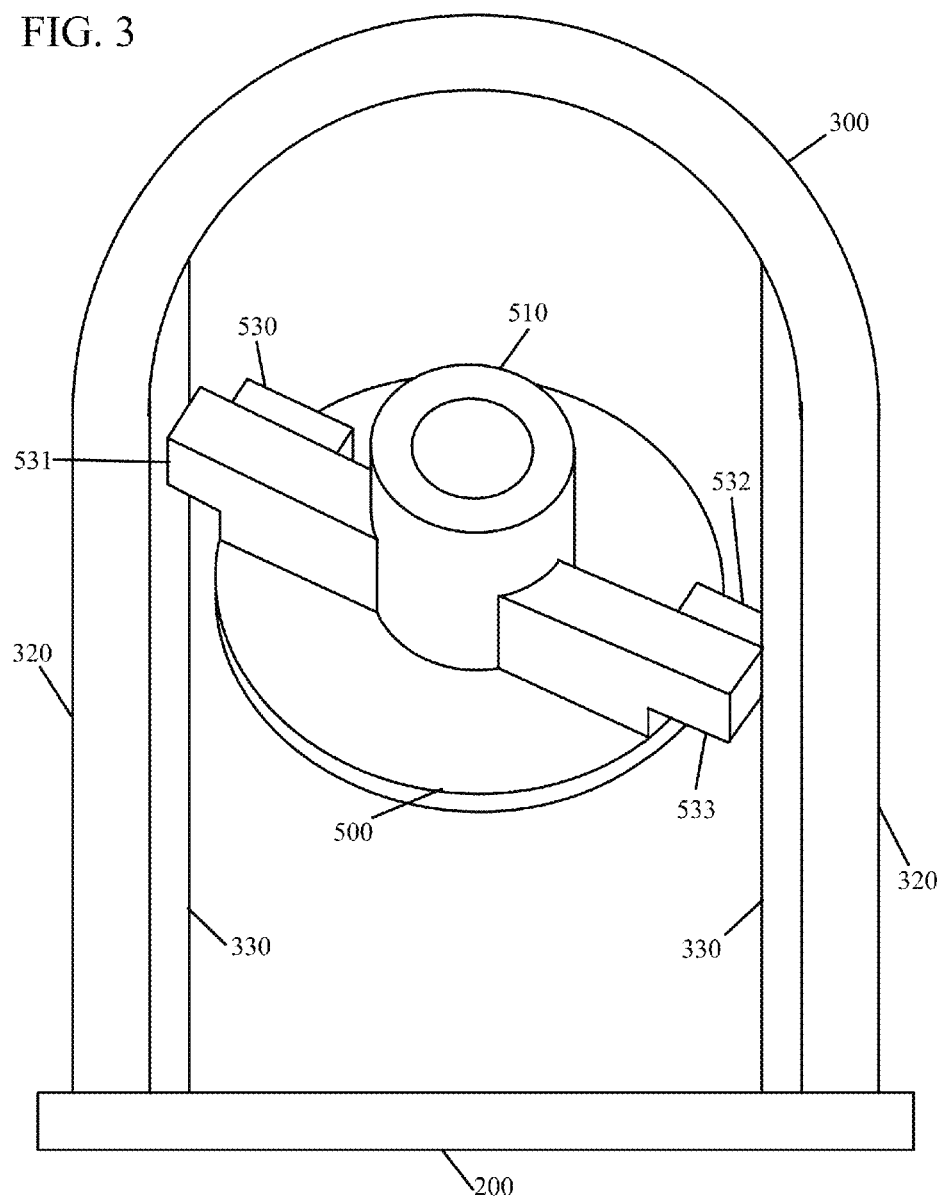
FIG. 3 shows the first step in assembling the drain plug in the yoke.
Figure 6:
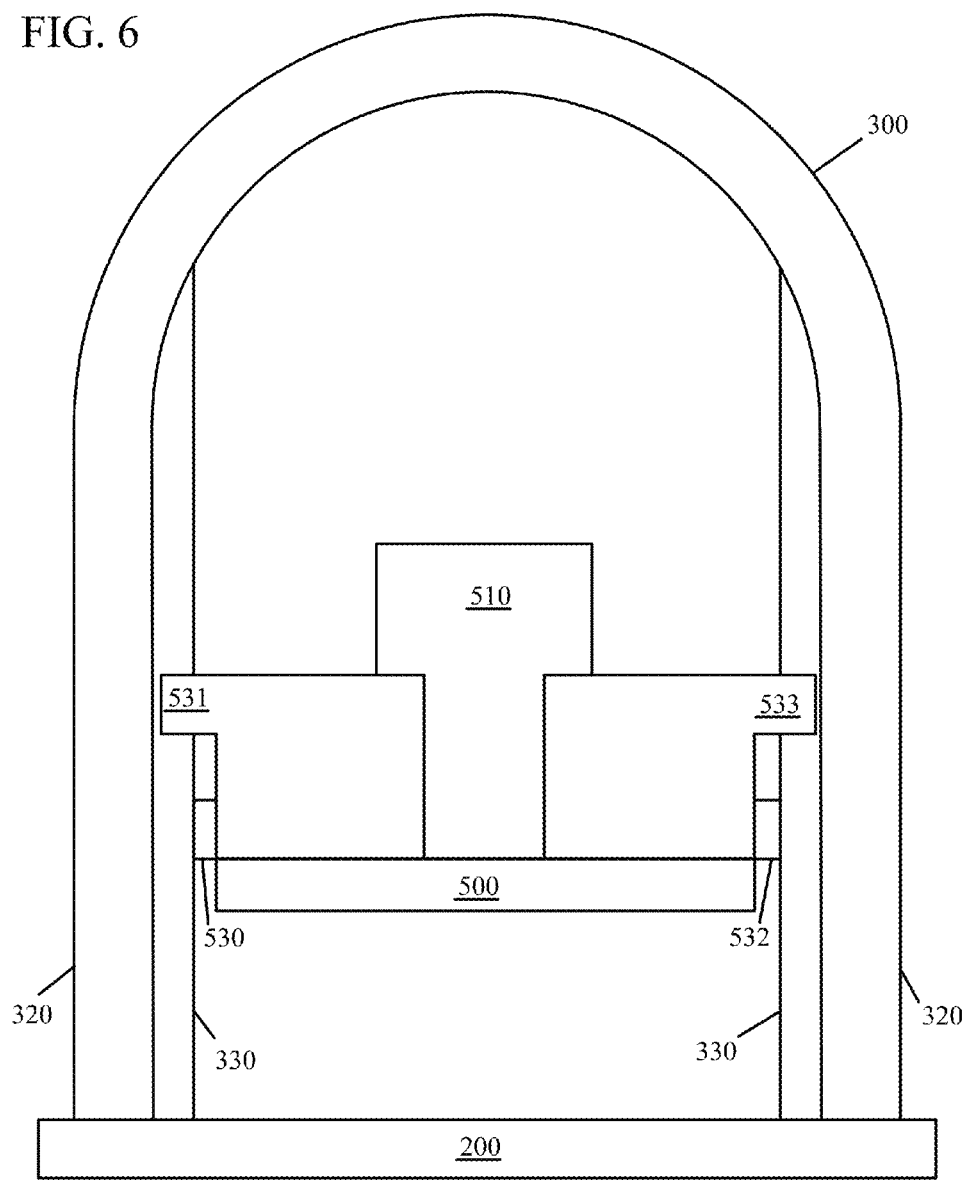
FIG. 6 shows a side view of the drain plug and yoke in their final assembly orientation.

Regardless of whether the valve plug 500 is inserted according to FIG. 3 or FIG. 4, it need only be tilted 90 degrees to bring it into its final orientation shown in FIG. 6. Once the valve plug 500 has been properly positioned, the stem 400 can be installed through the stuffing box 310 and connected to the lifting nut 510 to complete the assembly process. Removal of the valve plug 500, after removal of the stem 400 follows in reverse order of the steps outlined above.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A mud valve comprising:
    a) an annular frame having a lower surface forming a flange, and an upper surface with an open center having an inner circumference forming a seating surface with a seat angle relative to the upper surface of the annular frame;
    b) a yoke having an arch with an apex, a first arm with an inner surface and an end, and a second arm with an inner surface and an end; the inner surface of the first arm having a guide rail with a thickness, and the inner surface of the second arm having a guide rail with a thickness; the end of the first yoke arm and the end of the second yoke arm being permanently connected to the upper surface of the annular frame;
    c) a valve plug having a diameter with a first end and a second end, an upper surface, a lower surface with a circumference, and a seating surface on the circumference of the lower surface of the valve plug having a seat angle corresponding to the seat angle of the inner circumference of the annular frame;
    d) a first pair of tabs comprising a first tab mounted on the upper surface of the valve plug with a lower edge of the first tab at a first distance from the upper surface of the valve plug and a second tab mounted on the upper surface of the valve plug with a lower edge of the second tab at a second distance from the upper surface of the valve plug which is greater than the first distance, the first tab and the second tab being at opposite sides of the first end of the diameter, the pair of tabs extending radially past the first end of the diameter of the valve plug and being separated from each other by a distance at least as great as the thickness of the guide rail on the inner surface the first arm of the yoke;
    e) a second pair of tabs comprising a first tab mounted on the upper surface of the valve plug with a lower edge of the first tab at a first distance from the upper surface of the valve plug and a second tab mounted on the upper surface of the valve plug with a lower edge of the second tab at a second distance from the upper surface of the valve plug which is greater than the first distance, the first tab and the second tab being at opposite sides of the second end of the diameter, the pair of tabs extending radially past the second end of the diameter of the valve plug and being separated from each other by a distance at least as great as the thickness of the guide rail on the inner surface the second arm of the yoke; the first tab of the second pair of tabs being on a same side of the diameter as the first tab of the first pair of tabs, and the second tab of the second pair of tabs being on a same side of the diameter as the second tab of the first pair of tabs;

f) a valve stem passing through the apex of the yoke and having an end coupled to the upper surface of the valve plug; and wherein a distance between an upper edge of each first tab and a lower edge of each second tab in each of the pairs of tabs being at least as great as the thickness of the guide rail on the inner surface of the yoke.

2. The mud valve of claim 1, in which the end of the first yoke arm and the end of the second yoke arm are permanently connected to the upper surface of the annular frame by a weld.

3. The mud valve of claim 1, in which the end of the first yoke arm and the end of the second yoke arm are permanently connected to the upper surface of the annular frame by forming the yoke and the annular frame as a single casting.

4. The mud valve of claim 1, wherein the seat angle is 27 degrees.

5. The mud valve of claim 1, in which the seating surface of the annular frame further comprises a seating material.

6. The mud valve of claim 5, wherein the seating material is a resilient material.

7. The mud valve of claim 1, in which the seating surface of the lower surface of the valve plug further comprises a seating material.

8. The mud valve of claim 7, wherein the seating material is a resilient material.

9. The mud valve of claim 1, in which the apex of the arch further comprises a stuffing box through which the valve stem passes, and the end of the valve stem is coupled to the valve plug by a lifting nut on the upper surface of the valve plug.

10. A valve plug for a mud valve having an annular frame having a lower surface forming a flange, and an upper surface with an open center having an inner circumference forming a seating surface with a seat angle relative to the upper surface of the annular frame; and a yoke having an arch with an apex, a first arm with an inner surface and an end, and a second arm with an inner surface and an end, the inner surface of the first arm having a guide rail with a thickness, and the inner surface of the second arm having a guide rail with a thickness, the end of the first yoke arm and the end of the second yoke arm being connected to the upper surface of the annular frame; and a valve stem passing through the apex of the yoke and having a lower end; the valve plug comprising:

a) a body having a diameter with a first end and a second end, an upper surface, a lower surface with a circumference, and a seating surface on the circumference of the lower surface of the body having a seat angle corresponding to the seat angle of the inner circumference of the annular frame;

b) a first pair of tabs comprising a first tab mounted on the upper surface of the body with a lower edge of the first tab at a first distance from the upper surface of the body and a second tab mounted on the upper surface of the body with a lower edge of the second tab at a second distance from the upper surface of the body which is greater than the first distance, the first tab and the second tab being at opposite sides of the first end of the diameter, the pair of tabs extending radially past the first end of the diameter of the body and being separated from each other by a distance at least as great as the thickness of the guide rail on the inner surface the first arm of the yoke;

c) a second pair of tabs comprising a first tab mounted on the upper surface of the body with a lower edge of the first tab at a first distance from the upper surface of the body and a second tab mounted on the upper surface of the body with a lower edge of the second tab at a second distance from the upper surface of the body which is greater than the first distance, the first tab and the second tab being at opposite sides of the second end of the diameter, the pair of tabs extending radially past the second end of the diameter of the body and being separated from each other by a distance at least as great as the thickness of the guide rail on the inner surface the second arm of the yoke; the first tab of the second pair of tabs being on a same side of the diameter as the first tab of the first pair of tabs, and the second tab of the second pair of tabs being on a same side of the diameter as the second tab of the first pair of tabs;

d) a fitting on the upper surface of the body for coupling with the lower end of the valve stem;

wherein a distance between an upper edge of each first tab and a lower edge of each second tab in each of the pairs of tabs being at least as great as the thickness of the guide rail on the inner surface of the yoke.

11. The mud valve plug of claim 10, wherein the seat angle is 27 degrees.

12. The mud valve plug of claim 10, in which the seating surface of the lower surface of the body further comprises a seating material.

13. The mud valve plug of claim 12, wherein the seating material is a resilient material.

14. The mud valve plug of claim 10, in which the fitting is a lifting nut.

* * * * *